INVENTORS
ROBERT W. DICKINSON
DONALD T. EGGEN
BY
ATTORNEY

INVENTORS
ROBERT W. DICKINSON
DONALD T. EGGEN
BY

ATTORNEY

Feb. 9, 1965 R. W. DICKINSON ETAL 3,169,117
NUCLEAR REACTOR FUEL PASTE COMPOSITION
Filed May 9, 1961 5 Sheets-Sheet 3

INVENTORS
ROBERT W. DICKINSON
BY DONALD T. EGGEN

ATTORNEY

INVENTORS
ROBERT W. DICKINSON
DONALD T. EGGEN
BY
ATTORNEY

United States Patent Office 3,169,117
Patented Feb. 9, 1965

3,169,117
NUCLEAR REACTOR FUEL PASTE
COMPOSITION
Robert W. Dickinson, Northridge, and Donald T. Eggen, Santa Susana, Calif., assignors, by mesne assignments, to the United States of America as represented by the United States Atomic Energy Commission
Filed May 9, 1961, Ser. No. 108,880
3 Claims. (Cl. 252—301.1)

The present invention is directed to nuclear reactors and more particularly to a paste-fueled fast reactor.

The feasibility of a fast breeder power reactor has been established by the Experimental Breeder Reactor I. In such a reactor the greatest potential for economic improvement lies in the areas of increased achievable burn-up and reduced fabrication and processing costs. The prior art reactors of this type utilize solid fuels, which limit the operating centerline temperature to the order of 400° C. and which result in low specific powers. Further, where centerline temperatures in the more desirable range of 600 to 750° C. have been tried while attempting to achieve high burnup, i.e., two percent, distortion and swelling of the fuel has resulted. This distortion problem associated with solid fuels is apparently due to the retention of fission gases and products within the solid structure.

The present invention has as its primary purpose the utilization of a paste fuel in a nuclear reactor, thereby avoiding the growth and distortion problems associated with solid-fueled reactors.

Another object of the present invention is to provide a nuclear reactor with increased specific power and increased burnup capability.

Another object of the present invention is to provide a nuclear reactor in which the fuel is in paste form and is either confined within a fuel container or is mobile through the reactor core so that fission gases and products may be removed from the active portion of the core.

A further object of the present invention is the elimination of the costly and complex operations associated with solid fuel elements previously utilized in fast reactors of decladding and reconstitution of fissionable and fertile material.

These and other objects and advantages of the present invention will be more apparent from the following detailed description and drawings, made a part hereof, in which.

Figure 1:
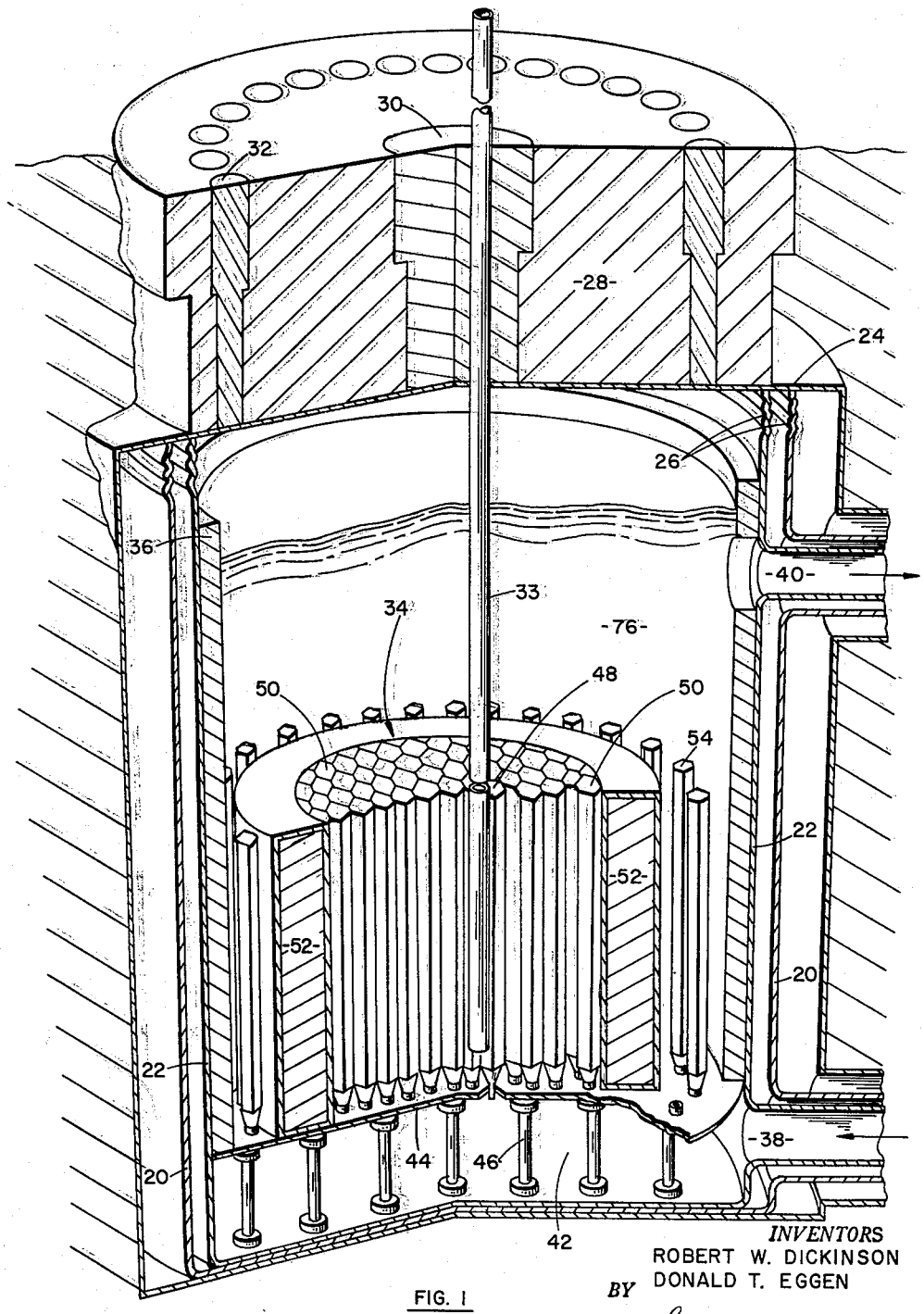
FIGURE 1 is a partially sectioned perspective view of one embodiment of the reactor of the present invention.

Referring now to the drawings in detail, one embodiment of the paste-fueled, fast reactor of the present invention is shown in FIG. 1 and includes an outer vessel 20 in which a sealed reactor vessel 22 is positioned, both vessels 20 and 22 being sealed to the containment vessel 24 by bellows 26 to allow independent expansion and contraction. A top shield plug 28 is centrally located above the reactor vessel 22 and has the conventional center plug 30 and fuel and blanket element removal plugs 32. Control elements 33 are suspended from the top shield for insertion into the core 34. Within the reactor vessel 22 is a thermal shield 36 extending around and spaced from the centrally located core 34. Coolant inlets 38 and outlets 40 are provided in the vessel 22, the inlet 38 being connected to an inlet plenum 42. The inlet plenum 42 is separated from the remainder of the reactor vessel 22 by a grid plate 44, supported by a plurality of supports 46, and has a plurality of apertures in which the fuel elements 48 are placed. The core is comprised of a plurality of closely packed hexagonal fuel elements 48 which form a right cylinder. A radial and axial blanket region 50 made up of similarly shaped elements surrounds the core. The blanket elements contain a paste composition containing fertile material. Radially outward from the core 34 and blanket 50 is a canned graphite reflector 52, and a storage space 54 for fuel elements.

Figure 2:
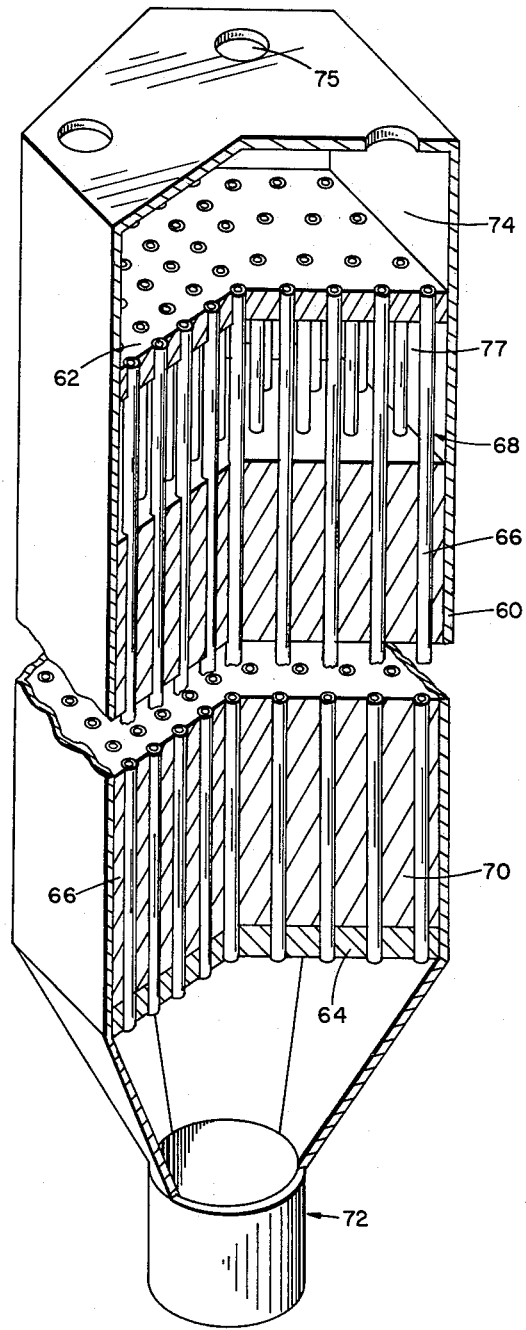
FIGURE 2 is a partially sectioned perspective view of the fuel element utilized in the embodiment of FIGURE 1.

The core and blanket elements are shown in FIG. 2 and are composed of a hexagonal shell 60, an upper and lower tube sheet 62 and 64, respectively, and a plurality of tubes 66. The tube sheets 62 and 64 are welded or otherwise sealed to the shell 60 and have a plurality of apertures in which the tubes 66 are sealed. In this manner a sealed chamber 68 is provided within the shell 60 which is traversed by a plurality of tubes 66. Within the sealed chamber 68 a quantity of static paste fuel 70 is placed. A coolant inlet header 72 is connected to the bottom of shell 60 and fits into the apertures of grid plate 44 so that the liquid metal coolant is directed upwardly through the tubes 66 into the coolant outlet header 74 and then through holes 75 into the liquid metal pool 76 above the reactor core. A gas space 77 provides for paste fuel thermal expansion and for fission gas release accumulation.

A hold-down mechanism, not shown, located above the core prevents axial movement of the fuel elements from the force of sodium flow and provides lateral support.

Figure 3:
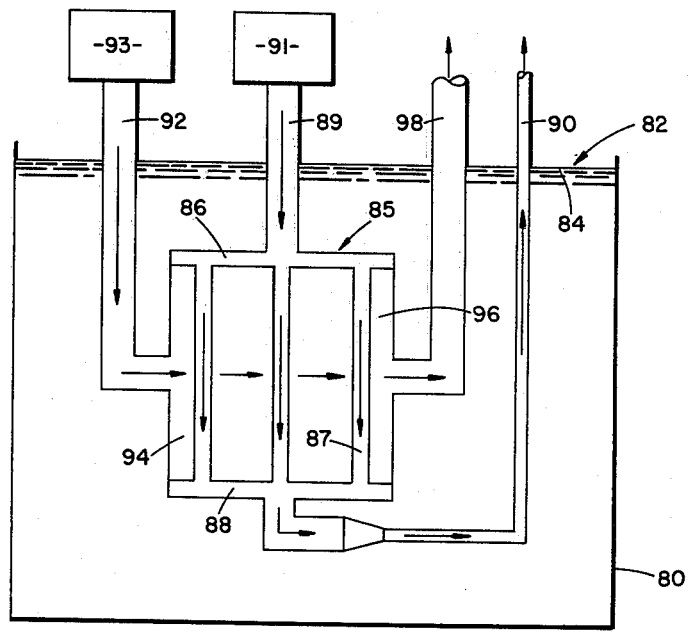
FIGURE 3 is a schematic view of another embodiment of the present invention.

Referring now to FIG. 3, a second embodiment of the present invention is shown and includes a reactor vessel 80 containing a quantity of fertile (blanket) material in liquid form, i.e., $U^{238}$ or $Th^{232}$ in a liquid metal. The vessel 80 has an inert gas 82 above its top level 84 and a conventional top shield plug, not shown. Supported within the vessel 80 and below the level 84 is a core 85 consisting of a top plenum 86 communicating with the interior of a plurality of tubes 87 which are connected at their lower extremity to an outlet plenum 88. The plenum 86 is connected to a source of paste fuel by pipe 89, while the outlet plenum 88 is connected through pipe 90 to a fuel reprocessing system and/or to the source of paste fuel. The paste fuel is pumped by pump 91, either continuously or discontinuously, through the tubes 87. The paste fuel in the tubes 87 and inlet and outlet plenums 86 and 88 constitutes a critical mass of fissionable fuel. The pipes 89 and 90 are so constructed that a critical mass is not present, i.e., the diameter is sufficiently small that a critical mass is not capable of being present regardless of the length. Additionally, neutron absorbers may be utilized as an added safety precaution.

The core 85 is cooled by a cross flowing coolant which is pumped by pump 93 through the inlet pipe 92 to the coolant inlet plenum 94 and through the core 85 along the outside of the tubes 87 containing the fuel. The heated sodium then passes through coolant outlet plenum 96 and outlet pipe 98 to a conventional heat utilization system. In this manner the paste fuel may be slowly moved through the critical volume while the heat is continuously extracted. It is also contemplated by the present invention to pump the paste in surges so that only a portion of the core fuel material is replaced with new fissionable material during a specified period of time. This embodiment preferably includes a reflector external to the vessel 30.

In the present invention, paste fuels are defined as small, solid, spheroidal particles (approximately 100 micron diameter) of fissionable and fertile alloys or compounds, packed to a settled density of about 40–60 volume percent with the interstices between the particles filled with liquid metal. Such settled two-phase systems are pastes, as distinguished from slurries that are two-phase systems in which the particles are dispersed (suspended) in the liquid by constant agitation. [See also Hammitt et al., "The Fission Gas Problem for Mobile Fuel Fast Reactors," Nuclear Science and Engineering 7: 327–335 (1950).]

In contrast to most of the mobile-fuel reactor concepts, the past reactor of the embodiments in FIGS. 1 and 3 does not use the fuel to transport heat from the reactor. The fuel in the embodiment of FIG. 3 is moved at a low velocity and in relatively small volumes through the reactor. The low velocity of the pastes substantially eliminates problems of erosion of containers by the particles and particle breakdown by attrition. By utilizing a non-corrosive liquid metal, e.g., sodium, in which the fuel material is insoluble, both corrosion of containers and mass transport are minimized. Such a system has the advantages of increased resistance of fuel to irradiation damage and dimensional change, ease of fuel fabrication, simplification of reactor loading, and unloading (at full power), integrated reprocessing and refabrication, and simplification of non-fuel portions of the reaction system.

The fuel materials utilized in the embodiments of the present invention are UC, PuC, ThC-UC, ThC-PuC, and PuC-UC. The high thermal conductivity of UC results in a high heat transfer rate. Sodium is preferred as the liquid metal carrier as well as the coolant, although lead and tin may be used as the carrier. However, the compatibility of lead and tin with the carbides and the difficulty in containing such metals in conventional construction materials at the preferred temperatures introduces significant problems of construction and maintenance.

Figure 4:
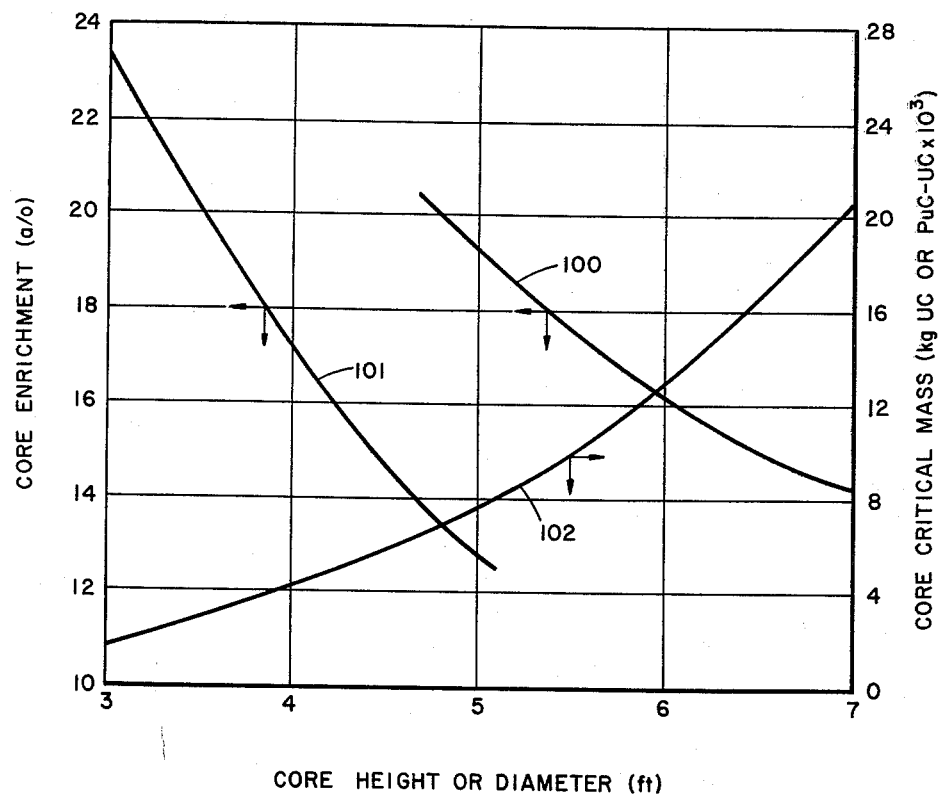
FIGURE 4 is a graph of core enrichment vs. core diameter.
Figure 5:
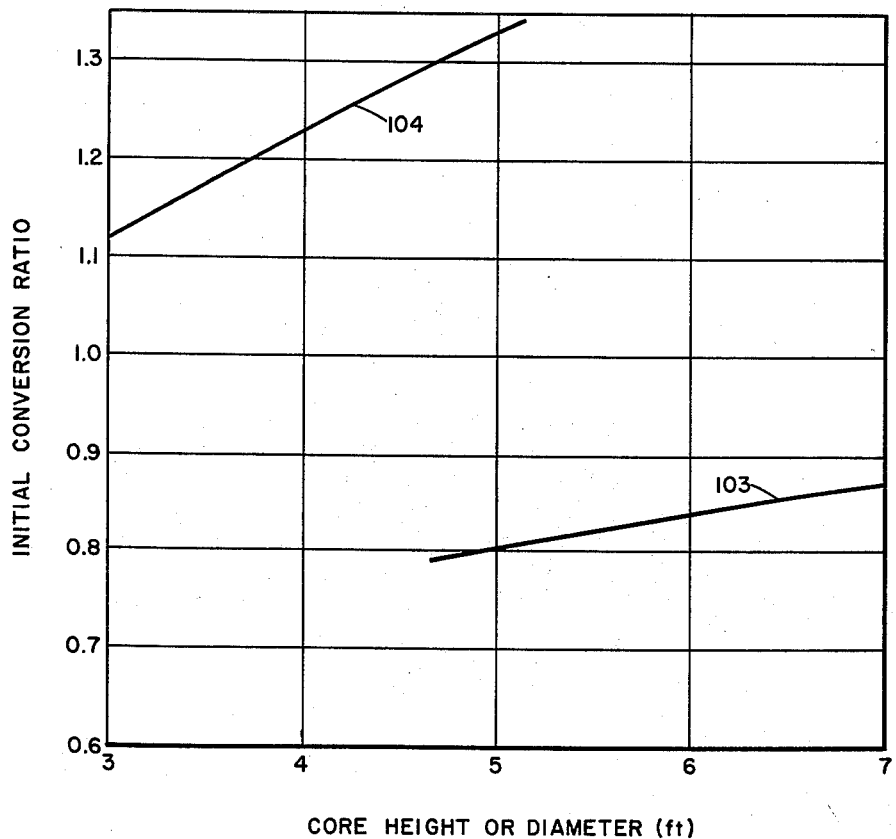
FIGURE 5 is a graph of initial conversion ratio vs. core diameter.

FIGURE 4 shows the relationship between core enrichment and critical mass for a paste-fueled, sodium-cooled fast reactor where the enrichment is defined as the atom fraction of $U^{235}$ in U or Pu in U plus Pu. These relationships are based upon a $k_{eff}$ of 1.050 with a peak fuel temperature of 1600° F., a paste fertile material of $U^{238}C$ and a blanket and reflector thickness of 18 inches each. Curve 100 is for the UC paste fuel case in a sodium carrier, while curve 101 is for the PuC-UC case, both curves showing the core enrichment (a/o) (left scale) as a function of core diameter or height. Curve 102 shows the relationship of the core height or diameter as a function of the core critical mass (right-hand scale). FIG. 5 shows the relationship between initial conversion ratio as a function of core height or diameter for the case of UC (curve 103) and for PuC-UC (curve 104); these two curves are derived upon the same bases as curves 100–102.

Figure 6:
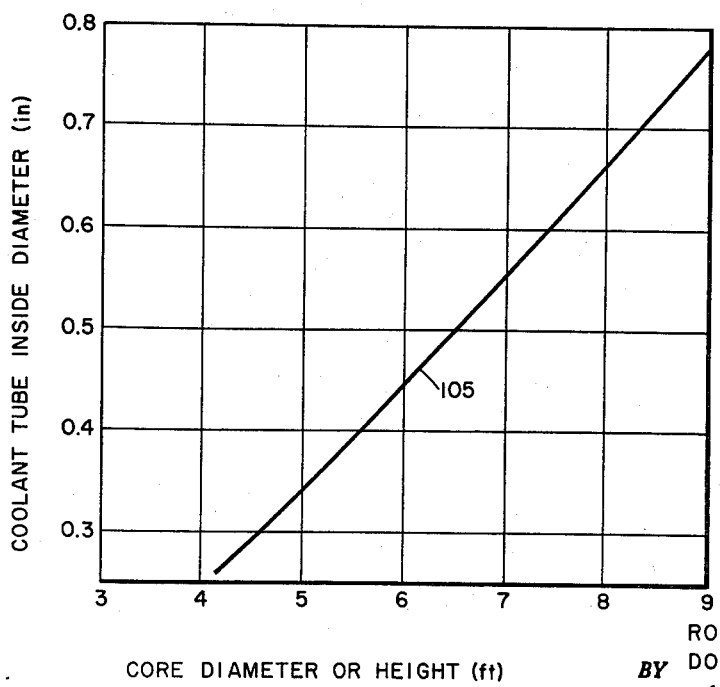
FIGURE 6 is a graph of coolant tube inside diameter vs. core diameter.

FIGURE 6 shows the variation in core diameter or height as a function of coolant tube inside diameter. Curve 105 is based upon a total power of 704 mwt. with a maximum fuel temperature of 1600° F.

With these relationships the characteristics of a number of paste-fueled fast reactors are shown in the following tables. Table I applies to each of the four examples given in Tables II and III. Table II shows the characteristics and parameters for the fast region and blanket region of the core for two different cases utilizing UC fuel in a sodium carrier as the paste fuel. Table III is similar to Table II and covers the case of a PuC-UC fuel in a sodium carrier as a paste fuel.

*Table I*

A. Total power (mwt.) _____ 704
B. Sodium outlet temperature (° F.) _____ 1200
C. Sodium inlet temperature (° F.) _____ 650
D. Sodium flowrate (lb./hr.) _____ $14.5 \times 10^6$
E. Peak fuel temperature (° F.) _____ 1600
F. Fast region volume fractions:
  (1) Fuel _____ 0.20
  (2) Sodium carrier _____ 0.20
  (3) Sodium coolant _____ 0.45
  (4) Stainless steel _____ 0.15
G. Blanket region volume fractions:
  (1) Fertile material _____ 0.40
  (2) Sodium _____ 0.49
  (3) Stainless steel _____ 0.11
H. Reflector region volume fractions:
  (1) Graphite _____ 0.97
  (2) Sodium _____ 0.025
  (3) Stainless steel _____ 0.005

*Table II.—UC-Na*

FAST REGION

| | | |
|---|---|---|
| A. Fuel | UC | UC |
| B. Dimensions: | | |
|   1. Core Diameter (ft.) | 5.0 | 7.0 |
|   2. Tube I.D. (in.) | 0.340 | 0.550 |
|   3. Tube Wall Thickness (in.) | 0.017 | 0.0275 |
| C. Nuclear: | | |
|   1. Power (Percent of total) | 97.4 | 98.5 |
|   2. Enrichment (at. percent $U^{235}$ or $Pu^{239}+Pu^{241}$) | 19.2 | 14.2 |
|   3. Mass of Fuel (kg.) | 7,450 | 20,450 |
|   4. Mass of $U^{235}$ (kg.) | 1,415 | 3,730 |
|   5. Mass of $Pu^{239}+Pu^{241}$ (kg.) | 0 | 0 |
|   6. Initial Conversion Ratio | 0.430 | 0.605 |
|   7. Radial Peak-to-Average Power | 1.57 | 1.70 |
|   8. Median Fission Energy (kev.) | 66 | 43 |
| D. Heat Transfer: | | |
|   1. Peak Heat Flux on Tube O.D. (B.t.u./hr.-ft.$^2$) | $0.80 \times 10^6$ | $0.535 \times 10^6$ |
|   2. Average Power Density (kw./ft.$^3$ region) | 6,970 | 2,570 |
|   3. Average Specific Power (kw./kg. $U^{235}$ or $Pu^{239}+Pu^{241}$) | 485 | 254 |
|   4. Average Sodium Velocity (ft./sec.) | 8.5 | 4.4 |
|   5. Maximum Sodium Velocity (ft./sec.) | 13.1 | 7.4 |

BLANKET REGION

| | | |
|---|---|---|
| A. Fertile Material | $U^{238}$ C | $U^{238}$ C |
| B. Region O.D. Dimensions (ft.) | 8.0 | 10.0 |
| C. Nuclear: | | |
|   1. Power (percent of total) | 2.6 | 1.5 |
|   2. Enrichment | 0.00 | 0.00 |
|   3. Mass of Fertile Material (kg.) | 23,250 | 60,800 |
|   4. Initial Conversion Ratio | 0.375 | 0.265 |
| D. Heat Transfer: | | |
|   1. Average Power Density (kw./ft.$^3$ region) | 119 | 38 |
|   2. Average Specific Power (kw./kg. $U^{238}$) | 0.79 | 0.17 |
| Reflector O.D. Dimensions (ft.) | 11 | 13 |
| Total Reactor Initial Conversion Ratio | 0.805 | 0.870 |

*Table III.—PuC-UC-Na*

FAST REGION

| | | |
|---|---|---|
| A. Fuel | PuC-UC | PuC-UC |
| B. Dimensions: | | |
|   1. Core Diameter (ft.) | 3.0 | 5.0 |
|   2. Tube I.D. (in.) | 0.165 | 0.340 |
|   3. Tube Wall Thickness (in.) | 0.00825 | 0.017 |
| C. Nuclear: | | |
|   1. Power (percent of total) | 95.5 | 97.4 |
|   2. Enrichment (at. percent $U^{235}$ of $Pu^{239}+Pu^{241}$) | 23.3 | 12.3 |
|   3. Mass of Fuel (kg.) | 1,680 | 7,784 |
|   4. Mass of $U^{235}$ (kg.) | 0 | 0 |
|   5. Mass of $Pu^{239}+Pu^{241}$ (kg.) | 392 | 956 |
|   6. Initial Conversion Ratio | 0.334 | 0.718 |
|   7. Radial Peak-to-Average Power | 1.38 | 1.56 |
|   8. Median Fission Energy (kev.) | 167 | 85 |
| D. Heat Transfer: | | |
|   1. Peak Heat Flux on Tube O.D. (B.t.u./hr.-ft.$^2$) | $1.45 \times 10^6$ | $0.80 \times 10^6$ |
|   2. Average Power Density (kw./ft.$^3$ region) | 31,600 | 6,950 |
|   3. Average Specific Power (kw./kg. $U^{235}$ or $Pu^{239}+Pu^{241}$) | 172 | 71.8 |
|   4. Average Sodium Velocity (ft./sec.) | 23.2 | 8.5 |
|   5. Maximum Sodium Velocity (ft./sec.) | 31.2 | 13.1 |

*Table III*—Continued

BLANKET REGION

| | $U^{235}$ C | $U^{238}$ C |
|---|---|---|
| A. Fertile Material | | |
| B. Region O.D. Dimensions (ft.) | 6.0 | 8.0 |
| C. Nuclear: | | |
| 1. Power (percent of total) | 4.5 | 2.6 |
| 2. Enrichment | 0.00 | 0.00 |
| 3. Mass of Fertile Material (kg.) | 9,650 | 23,250 |
| 4. Initial Conversion Ratio | 0.788 | 0.613 |
| D. Heat Transfer: | | |
| 1. Average Power Density (kw./ft.$^3$ region) | 495 | 119 |
| 2. Average Specific Power (kw./kg. $U^{238}$) | 3.27 | 0.79 |
| Reflector O.D. Dimensions (ft.) | 9 | 11 |
| Total Reactor Initial Conversion Ratio | 1.122 | 1.331 |

These characteristics are essentially unchanged for the embodiment of FIG. 3 except that the total fuel inventory would be increased for the external paste pumping and reprocessing systems. In this embodiment less than about 10 percent of the in-core inventory is pumped through the core each day, and preferably about 5 percent every 24 hours.

Although particular embodiments of the present invention have been described, various modifications will be apparent to those skilled in the art. Therefore, the present invention is not limited to the specific embodiments disclosed but only by the appended claims.

We claim:

1. A nuclear reactor fuel in paste form comprising a liquid metal and at least one fissionable fuel composition selected from the class consisting of UC, PuC and ThC, said paste containing solid particles of said fuel composition packed to a density of from about 40 to about 60 volume percent of said paste.

2. A nuclear reactor fuel paste composition consisting essentially of a sodium carrier and at least one fissionable fuel in solid particle form selected from the class consisting of UC, PuC and ThC, said solid particles being present in said composition in an amount of from about 40 to about 60 volume percent of said composition.

3. A nuclear reactor fuel composition consisting essentially of a sodium carrier and a fissionable fuel in solid particle form selected from the class consisting of UC, PuC, ThC-UC and PuC-UC, said solid particles having a diameter of about 100 microns and being present in said composition in an amount of from about 40 to about 60 volume percent of said composition.

References Cited by the Examiner

UNITED STATES PATENTS 2,910,417  10/59  Teitel _____ 204

FOREIGN PATENTS 790,688  2/58  Great Britain.

OTHER REFERENCES

Nucleonics, July 1954, vol. 12, No. 7, pp. 14 and 15.
Atomics, February 1957, pp. 41–45.

REUBEN EPSTEIN, *Acting Primary Examiner.*

ROGER L. CAMPBELL, CARL D. QUARFORTH,
*Examiners.*